United States Patent [19]

Gibbs et al.

[11] 4,056,501

[45] Nov. 1, 1977

[54] CATIONIC STRUCTURED-PARTICLE LATEXES

[75] Inventors: Dale S. Gibbs, Midland, Mich.; Earl H. Wagener, Concord, Calif.; Ritchie A. Wessling, Midland, Mich.

[73] Assignee: The Dow Chemical Company, Midland, Mich.

[21] Appl. No.: 569,723

[22] Filed: Apr. 21, 1975

[51] Int. Cl.$^2$ .............................................. C08L 9/08
[52] U.S. Cl. .................. 260/29.6 SQ; 260/29.6 TA; 260/29.6 HN; 260/29.6 MP; 260/29.6 MQ; 260/29.6 MN; 260/29.7 H; 260/29.7 T; 260/29.7 P; 260/29.7 SQ; 260/29.7 N
[58] Field of Search ............... 260/29.6 SQ, 29.6 TA, 260/29.6 HN, 29.6 MP, 29.6 MQ, 29.6 MN, 29.7 H, 29.7 T, 29.7 P, 29.7 SQ, 29.7 N, 607 B

[56] References Cited

U.S. PATENT DOCUMENTS

| 3,123,636 | 3/1964 | Loev et al. ........................... 260/552 |
|---|---|---|
| 3,178,396 | 4/1965 | Lloyd ................................ 260/80.72 |
| 3,236,820 | 2/1966 | Lloyd .................................. 260/79.3 |
| 3,491,050 | 1/1970 | Keberle et al. ............... 260/29.2 TN |
| 3,501,432 | 3/1970 | Wright et al. ................ 260/29.6 TA |
| 3,522,199 | 7/1970 | Keberle et al. ............... 260/29.2 TN |
| 3,534,105 | 10/1970 | Distler et al. ..................... 260/607 B |
| 3,594,355 | 7/1971 | Vandenbery et al. ........ 260/29.2 EP |
| 3,637,432 | 1/1972 | Gibbs et al. .................. 260/29.6 TA |
| 3,745,196 | 7/1973 | Lane ...................................... 260/884 |
| 3,772,143 | 11/1973 | Roth ................................. 260/79.3 R |
| 3,873,488 | 3/1975 | Gibbs et al. ..................... 260/29.7 T |
| 3,926,890 | 12/1975 | Huang et al. ................. 260/29.6 TA |

Primary Examiner—M. J. Welsh
Attorney, Agent, or Firm—I. A. Murphy

[57] ABSTRACT

Structured-particle latexes are prepared from nonionic or slightly cationic latexes, either preformed or polymerized in situ, by emulsion polymerizing monomeric materials which include an ethylenically unsaturated, activated-halogen monomer such as vinylbenzyl chloride in the absence of a sufficient amount of a surfactant to initiate new particles whereby the activated-halogen monomer is copolymerized on the surface of the existing particles which are dispersed in an aqueous media. The resulting structured-particle latex may then be reacted with a nucleophile such as dimethyl sulfide or trimethyl amine to form a latex having stabilizing "onium" groups such as sulfonium groups or quaternary ammonium groups chemically bound at or near the surface of the polymer particles which are dispersed in aqueous media. The cationic latexes are suitable for coatings and organic pigments.

19 Claims, No Drawings

CATIONIC STRUCTURED-PARTICLE LATEXES

BACKGROUND OF THE INVENTION

1. Field of the Invention

The invention is concerned with latex compositions and with methods for the preparation of such latexes. The polymer particles comprising the latex have stabilizing, pH independent ions chemically bound at or near the surface of the particles.

2. Description of the Prior Art

Latexes require some means for providing colloidal stabilization in aqueous media. The usual colloidal stabilization is provided for surfactants which usually are anionic or cationic but may be non-ionic, especially in mixtures with anionic or cationic surfactants. Even though they contribute to the required colloidal stability, the surfactants can interfere with coating performance of the latexes even though the amount is limited and less than the desired stability is obtained. Another method is to copolymerize with non-ionic monomers a small proportion of an ionic monomer to prepare a stable latex with little or no conventional surfactant as described in U.S. Pat. No. 3,637,432. Such processes, however, require special combinations of monomers and special polymerization techniques. Although such processes produce latexes having little or no surfactants, varying amounts of water-soluble products are made during carrying out of the process and remain in the product.

U.S. Pat. No. 3,236,820 describes the reaction of anionic latexes of polymers of vinylbenzyl chloride with sulfides to produce water-soluble cationic polymers. By starting with an anionic emulsion, the conversion of the polymerized vinylbenzyl chloride units on the particle to cationic groups causes destabilization of the latex. If the proportion of vinylbenzyl chloride units in the polymer is not high enough to render the polymer water-soluble in the converted form, the latex will coagulate.

Some of the latexes suitable for the practice of this invention are described and claimed in Applicant's copending application Ser. No. 569,724, filed Apr. 21, 1975, now U.S. Pat. No. 4,017,442.

SUMMARY OF THE INVENTION

This invention involves a latex having structured particles consisting of a water-insoluble, nonionic, organic polymer core encapsulated with a thin layer of a copolymer having chemically-bound, pH independent cationic groups, said structured particles having bound cationic charges at or near the outer surface of the particles. Such latexes may be obtained by copolymerizing under emulsion polymerization conditions an ethylenically unsaturated, activated-halogen monomer onto the particle surface of a latex of a non-ionic, organic polymer which is slightly cationic through the presence of adsorbed cationic surfactant. Alternatively, the precursor latex may contain, as the polymeric component, particles of a copolymer of an ethylenically unsaturated, activated-halogen monomer and an ethylenically unsaturated, nonionic monomer which is devoid of an activated-halogen, wherein the activated-halogens are uniformly or randomly distributed throughout the particles. The latexes of either type are reacted with a nonionic nucleophile to form latexes having structured particles consisting of a water-insoluble, nonionic, organic polymer core encapsulated with a layer of a copolymer having pH independent, cationic groups chemically-bound at or near the outer surface of the structured-particle, the amount of said groups being sufficient to provide a major portion of the colloidal stability but insufficient to make the polymer water-soluble.

DESCRIPTION OF THE PREFERRED EMBODIMENTS

In one embodiment, the preparation of the products of the present invention requires a starting latex comprising solid polymer particles colloidally dispersed in water, the composition and method of preparation of which are known per se, but which is subsequently modified so that the particles of the starting latex are encapsulated with a copolymer of an ethylenically unsaturated activated-halogen monomer with a hydrophobic, ethylenically unsaturated monomer which is devoid of an activated-halogen. The resulting latex comprises colloidally dispersed particles having reactive halogen groups on or near the surface of the particles. Such a latex can then be reacted with a low molecular weight, non-ionic, nucleophilic compound to form a latex having particles of polymer with pH independent cationic groups chemically bound to the particle surface. The colloidal stability of the latex is thereby enhanced and other advantageous properties are obtained.

There are many known latexes which may serve as the starting latex to prepare activated-halogen containing latexes and the composition is not narrowly critical. Such latexes are prepared by processes well known in the art. Preformed latexes having substantially no residual monomers may be used but advantageously these starting latexes can be prepared by emulsion polymerization as the first step in the preparation of latex products wherein some monomer and some free-radicals remain at the time of addition of the activated-halogen monomer. The starting latex, or components and methods for making such latex, are selected from the known latex compositions which are substantially devoid of anionic groups and/or anionic surfactants adsorbed or otherwise attached to the polymer particles comprising the latex. Preferably the latex is slightly cationic, usually from the presence of a small amount of a cationic surfactant. For best results the starting latex should not contain an amount of a surfactant sufficient to initiate new particles when additional monomer is introduced. The composition of the polymeric component of the starting latex also does affect certain properties of the final product since it constitutes a major portion of the total mass of the product. Thus, a selection will be made somewhat according to the desired polymeric properties known to be possessed by these prior art materials to supplement the properties which are attributable to the encapsulating component of the invention. Thus, as an illustration but not a limitation, for the predominant portion of the products, a starting latex which is film-forming at room temperature will be selected but there are uses for which a non-film forming starting latex would be selected, such as for plastic pigments. Ordinarily the starting latexes have a particle size of from about 500 to about 10,000 Angstroms, preferably from about 800 to about 3000 Angstroms. If the products are to be used in a manner such as to require certain commonly recognized characteristics, for example, low electrolyte concentration, such characteristics will be considered when selecting the starting latex and the ingredients to be used in carrying out subsequent parts of the process. Such selections are within the skill of the art and are not considered inventive aspects of the novel compositions and method herein described.

Typically the starting latexes are obtained by emulsion polymerization of one or more monomers. Such monomers are represented by the same monomers listed below for copolymerization with the activated-halogen monomers.

The starting latexes for encapsulation also may consist essentially of polymers which are not prepared readily from monomers by emulsion polymerization, either because no substantial polymerization at a commercially acceptable rate is obtained under usual emulsion polymerization conditions, such as with isobutene, or because a particular form of the polymerized monomer is desired, for example stereospecific polyisoprene, stereospecific polybutadiene and the like. Representative pre-formed polymers are polymers and copolymers of the mono-olefins having from 2 to 20 carbon atoms such as ethylene, propylene, 1-butene, 2-butene, isobutene, pentene, hexene, octene, dodecene, hexadecene, octadecene, and especially those mono-olefins having up to 8 carbon atoms. Especially common types are the various ethylene/propylene copolymers.

Illustrative of still other polymers which may be constituents for the starting latex for encapsulation are alkyd resins, block and graft copolymers; e.g., styrene/butadiene graft and block copolymers; epoxy resins such as the reaction products of epichlorohydrion and bisphenol-A; and thermosettable vinyl ester resins; e.g., the reaction products of approximately equimolar amounts of a polyepoxide and an unsaturated monocarboxylic acid such as acrylic acid and methacrylic acid or unsaturated fatty acids such as oleic acid.

Methods for preparing the above described polymers and methods for converting the polymers to latexes are well known and are not a part of this invention.

In one method for obtaining a latex which is suitable for subsequent reaction according to the method of this invention, the particles of a starting latex are encapsulated with a thin layer of a copolymer of an ethylenically unsaturated activated-halogen monomer either by adding the activated-halogen monomer or a mixture of such monomers to the reaction mixture of the starting latex before all of the monomers are converted to polymer or by adding the activated-halogen monomer together with one or more hydrophobic monomers to the starting latex containing essentially no residual monomers, and initiating and continuing polymerization of the thus-added monomers to substantially complete conversion. Other latexes suitable for reaction according to the method of invention may be obtained by direct emulsion polymerization of an ethylenically unsaturated, activated-halogen monomer and an ethylenically unsaturated, nonionic monomer which is devoid of an activated-halogen. Latexes containing particles of copolymer having activated-halogens uniformly or randomly distributed throughout the particles are thereby obtained.

The activated-halogen monomers for either type of latex should be sufficiently activated to react at a reasonable rate after polymerization with subsequently added nucleophilic agents but should not be so reactive as to hydrolyze readily in an aqueous medium. Such suitable monomers are represented by ethylenically unsaturated benzylic chloride or bromide monomers, ethylenically unsaturated aliphatic bromide monomers and ethylenically unsaturated aliphatic iodide monomers. Specific preferred activated-halogen monomers are represented by vinylbenzyl chloride, vinylbenzyl bromide, 2-chloromethylbutadiene, vinyl bromide and bromo-alkyl acrylate or bromoalkyl methacrylate especially 2-bromoethyl acrylate or 2-bromoethyl methacrylate.

The activated-halogen monomers are oil soluble, are easy to polymerize in emulsion, do not inhibit free radical polymerization and diffuse at a satisfactory rate through the aqueous medium of a latex to the latex particle.

The hydrophobic, ethylenically unsaturated monomer which may be copolymerized with the activated-halogen monomer may be selected from the known wide variety of non-ionic, ethylenically unsaturated monomers which are polymerizable in aqueous emulsion to form a water-insoluble polymer. These monomers are well-known in the art and hence are illustrated below only by representative examples. The non-ionic ethylenically unsaturated monomers are represented by, but not restricted to, hydrocarbon monomers such as the styrene compounds, e.g., styrene, α-methylstyrene, ar-methylstyrene, ar-ethylstyrene, α,ar-dimethylstyrene, ar,ar-dimethylstyrene, and t-butylstyrene; the conjugated dienes, e.g., butadiene and isoprene; the hydrocarbon monomers which are modified to possess non-ionic substituents, e.g., hydroxystyrene, methoxystyrene, and cyanostyrene; the unsaturated alcohol esters such as vinyl acetate and vinyl propionate; the unsaturated ketones, e.g., vinyl methyl ketone and methyl isopropenyl ketone; the unsaturated ethers, e.g., vinylethyl ether and vinyl methyl ether; and the non-ionic derivatives of ethylenically unsaturated carboxylic acids such as acrylic esters, e.g., methyl acrylate, ethyl acrylate, butyl acrylate, hexyl acrylate, 2-ethylhexyl acrylate and lauryl acrylate; methacrylic esters, e.g., methyl methacrylate, ethyl methacrylate; the maleic esters such as dimethyl maleate, diethyl maleate and dibutyl maleate; the fumaric esters, e.g., dimethyl fumarate, diethyl fumarate and dibutyl fumarate, and the itaconic esters, e.g., dimethyl itaconate, diethyl itaconate and dibutyl itaconate; and the nitriles, e.g., acrylonitrile and methacrylonitrile. While not in the preferred class, non-ionic monomers containing halogens which are not activated may be employed, such as monochlorostyrene, dichlorostyrene, vinyl fluoride and chloroprene. Also non-ionic monomers which form water-soluble homopolymers, e.g., acrylamide, methacrylamide, hydroxyethyl acrylate and hydroxyethyl methacrylate, may be mixed with a hydrophobic monomer in small amounts up to about 10 percent, based on the amount of hydrophobic monomer.

By the term "pH independent groups" as applied to ionic groups is meant that the groups are predominantly in ionized form over a wide range in pH, e.g., 2–12.

By the term "non-ionic" as applied to the monomers is this specification is meant that the monomers are not ionic per se or do not become ionic by a simple change in pH. For illustration, while a monomer containing an amine groups is non-ionic at high pH, the addition of a water-soluble acid reduces the pH and forms a water-soluble salt; hence, such a monomer is not included.

In carrying out the polymerization of the activated-halogen monomer with those embodiments in which it is desired not to have activated-halogens in the interior of the particle, the ratio of monomer to total polymer in the latex should be kept low at any given time during the process so as to avoid unduly swelling the existing latex particles. With too much swelling, i.e., too much monomer dissolved in the polymer, some polymerization may occur in the interior of the particle. With that occurrence, the reactive halogens are buried in the particle. The activated-halogen monomer is added to the starting latex over a short period or is added as a shot in one or more increments. Optionally, but preferably a hydrophobic monomer devoid of an activated-halogen or a mixture of such monomers also is added, usually in admixture with the activated-halogen monomer. The polymerization is advantageously carried out at as low a temperature as will provide a practical polymerization rate in order to avoid hydrolyzing the activated-halogen monomer. Such temperatures range from about 0° to about 80° C, preferably from about 50° to about 70° C. Unless the starting latex is prepared in situ, an initator system (catalyst) is added to activate the latex particle surface, i.e., set up a steady state concentration of free-radicals. Continued addition of the initiator system after the addition of monomers can be carried out, if desired—especially when a redox system is used. The polymerization reaction is continued until the monomers are substantially completely copolymerized.

The product obtained by the above-described method is a latex of which the colloidally dispersed polymer particles, having a particle size of from about 500 to about 10,000 Angstroms, consist of the starting latex particles encapsulated with a bound layer having a thickness of from a monomolecular layer of the copolymer to about 100 Angstroms, the layer consisting of a functional polymer with activated-halogen groups on the outer surface thereof.

The amount of activated-halogen monomer copolymerized in the encapsulating layer of the structured-particle latex ranges from about 0.01 milliequivalent to about 1.4 milliequivalents, preferably from about 0.04 milliequivalent to about 0.5 milliequivalent, per gram of total polymer in the latex. However, there must be a sufficient amount of the hydrophobic monomer copolymerized with the activated-halogen monomer so that for each gram of polymer in the encapsulating layer, i.e., the cap, there is not more than 3.0 milliequivalents of the copolymerized activated-halogen monomer. The proportion of activated-halogen monomer is inversely related to the particle-size of the latex being encapsulated and also is inversely related to the molecular cross-sectional area of the activated-halogen monomer. Thus, one would not use the minimum amount of activated-halogen monomer with a starting latex of the smallest particle size.

The initiators used in the polymerization of the activated-halogen monomers are of the type which produce free-radicals and conveniently are per-oxygen compounds, for example: the inorganic peroxides such as hydrogen peroxide; the organic hydroperoxides such as cumene hydroperoxide and t-butyl hydroperoxide; the organic peroxides such as benzoyl peroxide, acetyl peroxide, lauroyl peroxide, peracetic acid and perbenzoic acid—sometimes activated by water-soluble reducing agents such as a ferrous compound, sodium bisulfite or hydroxylamine hydrochloride—and other free-radical producing materials such as 2,2'-azobisisobutyronitrile.

The organic hydroperoxides and 2,2'-azobisisobutyronitrile are preferred.

The surfactants which are used either in the starting latex or as additives for further stabilization of the latex products are cationic surfactants or non-ionic surfactants or mixtures thereof.

The cationic surfactants include the classes of salts of aliphatic amines, especially the fatty amines, quaternary ammonium salts and hydrates, fatty amides derived from disubstituted diamines, fatty chain derivatives of pyridinium compounds, ethylene oxide condensation products of fatty amines, sulfonium compounds, isothiouronium compounds, and phosphonium compounds. Specific examples of the cationic surfactants are dodecylamine acetate, dodecylamine hydrochloride, tetradecylamine hydrochloride, hexadecylamine acetate, lauryl dimethylamine citrate, octadecylamine sulfate, dodecylamine lactate, cetyl trimethyl ammonium bromide, cetyl pyridinium chloride, an ethanolated alkyl guanidine amine complex, stearyl dimethyl benzyl ammonium chloride, cetyl dimethyl amine oxide, cetyl dimethyl benzyl ammonium chloride, tetradecylpyridinium bromide, diisobutyl phenoxy ethoxy ethyl dimethyl benzyl ammonium chloride, 1-(2-hydroxyethyl)-2-(mixed pentadecyl and heptadecyl)-2-imidazoline, resin amine ethoxylate, oleyl imidazoline, octadecyl ethylmethyl sulfonium methyl sulfate, dodecyl-bis-$\beta$-hydroxyethylsulfonium acetate, dodecylbenzyldimethylsulfonium chloride, dodecylbenzyltrimethylphosphonium chloride, S-p-dodecylbenzyl-N,N,N',N'-tetramethylisothiouronium chloride, and the like.

Typical non-ionic emulsifiers (surfactants) are compounds formed by the reaction of an alkylene oxide, such as ethylene oxide, propylene oxide, or butylene oxide with long chain fatty alcohols, long chain fatty acids, alkylated phenols, long chain alkyl mercaptans, long chain alkyl primary amines, for example, cetylamine, the alkylene oxides being reacted in a ratio of such as 5 moles to 20 moles or higher such as up to 50 moles per mole of the co-reactant. Similarly effective compounds are monoesters such as the reaction products of a polyethylene glycol with a long chain fatty acid, for example, glycerol monostearate, sorbitan trioleate, and partial and complete esters of long chain carboxylic acids with polyglycol ethers of polyhydric alcohols. by "long chain" in the above description is usually meant an aliphatic group having from six carbon atoms to 20 or more.

The preferred surfactants are surfactants having pH independent cationic groups and especially preferred are the fugitive surfactants such as cationic surfactants in which the cationic group is sulfonium, sulfoxonium, isothiouronium or a reducible quaternary nitrogen group, e.g., pyridinium, isoquinolinium and quinolinium.

The latex according to the foregoing description, containing particles of the starting latex encapsulated with a relatively thin coating of a copolymer of the active-halogen monomer with a hydrophobic ethylenically unsaturated monomer, can then be reacted with a low molecular weight, non-ionic, water-stable nucleophilic compound, which can diffuse through an aqueous phase, to form particles of polymer having pH independent cationic groups, i.e., onium ions, chemically attached to the particle surface. Ordinarily, the particles are approximately spherical.

Alternatively, a latex of a copolymer having activated-halogens uniformly or randomly placed throughout the polymer particles comprising the latex may be reacted with a non-ionic nucleophile to prepare a cationic structured-particle latex, provided that compositions and conditions are chosen such that only the active-halogens at or near the surface of the particle are reacted with the nucleophile. The amount of activated-halogen in such copolymers should not exceed about 3.0 meq/g. Since the rate of reaction of the activated-halogens at or near the surface of the particle in such copolymers is considerably faster than for halogens in the interior of the particle, kinetic data will show when the thin layer near the surface has reacted. With copolymers having higher amounts of activated-halogen monomer polymerized throughout the particle, swelling of the particle occurs as the nucleophile reacts, further reaction within the particle can occur rather readily, controlling the reaction to attain a structured-particle is difficult and the same advantageous results are not obtained.

For each active halogen which is reacted with a non-ionic nucleophile, one charge which is bound to the polymer is produced and one halide ion is relased. In the reaction of a nucleophile with an activated-halogen, structured-particle latex or with a latex having activated-halogens distributed throughout the latex particle, the amount of halogen reacted is such as to provide from about 0.01 to about 0.5 milliequivalent of charge per gram of polymer. Preferably, the range is from about 0.04 to about 0.35 milliequivalent of charge per gram of polymer. However, in the thin reacted layer near the surface of the particle, the amount of bound charge is from about 0.4 milliequivalent to about 2.5 milliequivalents for each gram of polymer in the layer.

The nucleophilic compounds which are operable in the practice of this invention are non-ionic, carbon-containing nucleophiles which are stable in and can diffuse through aqueous media having a hetero atom as the center of nucleophilicity wherein all covalent bonds of said hereto atom are to a carbon atom.

The nucleophilic compounds which are used advantageously in the practice of this invention are represented by the following classes of compounds, sometimes called Lewis bases:

a. monobasic aromatic nitrogen compounds
b. tetra (lower alkyl) thioureas
c. $R_1$—S—$R_2$ wherein $R_1$ and $R_2$ individually are lower alkyl, hydroxy lower alkyl or wherein $R_1$ and $R_2$ are combined as one alkylene radical having 3 to 5 carbon atoms
d.

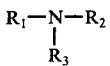

wherein $R_2$ and $R_3$ individually are lower alkyl or hydroxy lower alkyl, or are combined as one alkylene radical having 3 to 5 carbon atoms and $R_1$ is lower alkyl, aralkyl or aryl except when $R_2$ and $R_3$ together are an alkylene radical then $R_1$ is lower alkyl or hydroxy lower alkyl, and e.

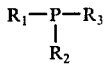

wherein $R_1$, $R_2$ and $R_3$ individually are lower alkyl, hydroxy lower alkyl or aryl.

In this specification the term lower alkyl means an alkyl having from 1 to 4 carbon atoms such as methyl, ethyl, propyl, isopropyl, n-butyl and isobutyl.

Representative specific nucleophilic compounds are pyridine, quinoline, isoquinoline, tetramethyl thiourea, tetraethyl thiourea, hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, N-methylpiperidine, N-ethylpyrrolidine, N-hydroxyethylpyrrolidine, trimethylphosphine, triethylphosphine, tri-n-butylphosphine, trimethylamine, triethylamine, tri-n-propylamine, tri-isobutylamine, hydroxyethyldimethylamine, butyldimethylamine, tri-hydroxyethylamine, triphenylphosphorus, and N,N,N-dimethylphenethylamine.

In carrying out the reaction between the nucleophilic compound and the particles of latex having activated halogens chemically bound to the surface thereof, the latex is stirred gently while the nucleophilic compound is added thereto, as the compound per se or in the form of a solution. Gentle stirring may continue throughout the ensuing reaction, or optionally after dispersion of the compound in the latex, the stirring may be discontinued. The reaction is conveniently carried out at ambient temperature although temperatures from about 0° to about 80° C can be used. The reaction occurs spontaneously at a rate which depends upon the reactivity of the activated halogen and of the nucleophile. It is preferred to carry out the reaction until a predominant proportion of the colloidal stability of the product is provided by the resulting chemically bound cationic groups. Usually a catalyst is not required although with the less reactive materials, a small amount of iodide ion may be used to facilitate the reaction. When a desired degree of reaction is reached, any excess nucleophile commonly is removed by standard methods, e.g., dialysis, vacuum stripping and steam distillation.

Other pH independent cationic groups can be substituted for cationic groups which are chemically bound to the latex particles according to the foregoing description by carrying out a further reaction with such cationic groups. For example, a cationic structured-particle latex having sulfonium groups chemically bound to the structured-particles at or near the particle surface can be reached with hydrogen peroxide at a temperature of from about 20° to about 80° C., preferably at ambient temperature, for a sufficient time to oxidize part or all of the sulfonium groups to sulfoxonium groups. Such treatment also reduces the odor of the latex. For best results in such an oxidation reaction, the hydrogen peroxide is used in excess, e.g., from 2 to 10 moles of hydrogen peroxide for each mole of sulfonium groups.

When the products are to be used in metal coating, it is preferred to react an activated-halogen latex containing only as much activated-halogen as is desired to be converted to bound charge. The activated-halogens are then fully converted to cationic groups and there is no bound activated-halogen in the product.

The cationic latexes of the present invention have considerably improved chemical and mechanical stability. In many applications, however, such as in coating hydrophobic substrates, latexes stabilized only by charges chemically bound to the particle surface have too high surface tension to provide good wetting of the hydrophobic surface. In such instances the addition to the latex of small amounts, such as from about 0.01 meq to about 0.1 meq/g. of polymer, of conventional cationic or nonionic surfactant is advantageous. In still other applications, the presence of even small amounts of water soluble surface active agents is detrimental. The latexes of the present invention are highly advantageous for such applications. Since a sufficient amount of charge is chemically bonded to the particle surface to provide colloidal stability, exhaustive dialysis or ion exchange can be used to remove water-soluble material from the latex and substitute counter ions, if desired, while retaining cationic functionality and colloidal stability of the latex.

A simple test is suitable to screen the latexes for shear stability: a drop of latex is placed in the palm of the hand and rubbed back and forth with a finger. As the latex is sheared, it gradually dries out and forms a film. Unstable latexes coagulate before drying, usually after 1 to 3 rubs. Stable latexes can be rubbed more than 5 cycles before failure. Latexes which tolerate 20 rubs are very stable and can be rubbed to dryness before setting up.

The rub test correlates with a more sophisticated test in which a drop of latex is sheared in a cone and plate viscometer (Rotovisco rotational viscometer). A very stable latex according to the rub test can be sheared for greater than 15 minutes at 194 rpm without coagulation of the latex.

The particles of the latexes of this invention, i.e., the starting latexes and the products, generally are approximately spherical in shape and have a particle size (diameter) of from about 500 Angstroms to about 10,000 Angstroms.

The following examples illustrate ways in which the present invention can be practiced, but should not be construed as limiting the invention. All parts and percentages are by weight unless otherwise expressly indicated. The particle sizes shown in the examples are average particle diameters obtained by light scattering measurements, except as indicated.

EXAMPLE I

A thermoplastic acrylic latex is prepared in the following manner. A monomer mixture is prepared from 1072 grams of ethyl acrylate and 528 grams of methyl methacrylate and to this mixture is added 24 grams of dodecanethiol and 5 grams of an 82.7-percent solution of t-butyl hydroperoxide to form a monomer feed solution. A seed latex is prepared from 750 grams of a surfactant solution previously prepared by stirring 710 grams of water and 40.0 grams of a 25-percent-active solution of dodecylbenzyldimethylsulfonium chloride for 2 hours under a stream of nitrogen to which is then added 25 grams of the monomer feed solution, followed by a continuously-added reducing stream pumped for about 2 hours at a rate of 7.67 grams per hour, the stream being a portion of a solution previously prepared from 9 grams of hydroxylamine hydrochloride diluted to 500 grams with deionized water. To the seed latex is added monomer feed solution at a rate of 55 grams per hour with continuation of a reducing stream of the same rate of addition and composition as in the seed latex and concurrently pumping into the reaction mixture at the rate of 20 grams per hour a surfactant solution previously prepared from 400 grams of deionized water and 100 grams of a 25-percent-active solution of dodecylbenzyldimethylsulfonium chloride. After 20 hours the conversion is about 85 percent, the continuous additions are discontinued, 15 grams of vinylbenzyl chloride is added and the reaction is allowed to continue for an additional 2 hours. The temperature is maintained at 50° C throughout the reaction. There is obtained thereby a latex (C-1) having a solids content of 47.6%, a pH of 2.8, a particle size of 1250 Angstroms, and containing a polymer having a molecular weight of 74,000 with a chloride ion content of 0.113 milliequivalent per gram of polymer.

A portion of Latex (C-1) is diluted with water to a solids content of 23.8%, then 2.12 parts of trimethylamine per 100 parts of the diluted latex are added with gentle stirring and the resulting mixture is allowed to stand at room temperature for 5 days. A latex (I-A) is obtained containing 0.242 milliequivalent of total charge per gram of polymer of which 0.129 milliequivalent is present from quaternary ammonium groups bound to each gram of polymer in the latex.

Another portion of Latex C-1 is treated as described for Example 2 except that 2.24 parts of dimethyl sulfide is substituted for the trimethylamine. A latex (I-B) is obtained which contains 0.237 milliequivalent of total charge per gram of polymer of which 0.124 milliequivalent is present from sulfonium groups bound to each gram of polymer in the latex.

EXAMPLE II

Latexes are prepared in a semi-continuous method according to the following description. Various compositions are prepared for addition is separate streams.

Initial Aqueous Solution 8.75 grams of 85.5% aqueous solution of phosphoric acid
1000 grams of water
sufficient ammonium hydroxide to adjust the pH of above solution to 5.0
20 grams (active basis) of dodecylbenzyldimethylsulfonium chloride
sufficient water to provide 2000 grams of solution
sufficient ammonium hydroxide to adjust the pH to 5.0

Continuous Emulsifier Stream 125 grams (active basis) of dodecylbenzyldimethylsulfonium chloride
sufficient water to provide 1000 grams of an aqueous solution containing 125 grams (active basis) of dodecylbenzyldimethylsulfonium chloride.

Continuous Initiator Stream 500 grams of an aqueous solution containing 27.5 grams (active basis) of t-butylhydroperoxide.

Continuous Reducing Agent Stream 500 grams of an aqueous solution containing 14 grams of hydroxylamine hydrochloride.

First Monomer Solution 1500 grams of butadiene
1200 grams of styrene
300 grams of butyl acrylate
3 grams of dodecanethiol (chain transfer agent)

Second Monomer Solution 250 grams of butyl acrylate
50 grams of vinylbenzyl chloride
3 grams of dodecanethiol

Process

The initial aqueous solution is placed in a 2-gallon Pfaudler reactor fitted with a crowfoot stirrer and the partially filled reactor is purged with nitrogen four times, then 100 grams of the first monomer solution is added, the pressure in the reactor is raised to 35 psig with nitrogen, and the temperature is raised to 50° C. The continuous initiator stream and the continuous reducing agent stream are started, each at the rate of 10 grams per hour. After 3 hours of such addition with agitation (at 235 rpm of the stirrer), the monomer solution and the continuous emulsifier stream are pumped into the reactor at rates of 40 grams per hour and 110 grams per hour, respectively, for a period of 19 hours. The continuous initiator stream, the continuous reducing agent stream and the continuous emulsifier stream are maintained while the second monomer solution is fed at the rate of 50 grams per hour for a period of 3 hours. The continuous initiator stream, the continuous reducing agent stream, the stirring and maintenance of polymerization temperature at 50° C are continued for an additional 45 minutes. A latex (C-2) having 40.4 percent solids and a particle size of about 1120 Angstroms is obtained.

Another latex is prepared as described for Latex C-2 except that the first monomer solution was fed for 20 hours rather than 19, the second monomer solution is not added and the feeding of the continuous initiator stream, the continuous reducing agent stream, and maintenance of stirring and the reaction temperature of 50° C. are continued for four hours after discontinuance of the first monomer solution feed. Latex C-3 (not an example of the invention) is obtained having a solids content of 39.2 percent and a particle size of 1115 Angstroms. With a portion of the latex is mixed sufficient dodecylbenzyldimethylsulfonium chloride to provide an additional 0.09 milliequivalent of sulfonium ion per gram of polymer in the latex and the pH is adjusted to 7.6 (Latex C-3A)

With a portion of Latex C-2 is mixed, with gentle stirring, dimethyl sulfide in an amount calculated to provide an excess based on the amount of active halogen in the latex. The resulting mixture is allowed to stand at room temperature for about 16 hours. The latex (II-A) is then steam distilled and is found to contain 0.05 milliequivalent of bound sulfonium cation per gram of polymer. A portion of Latex II-A is diluted with water to 10 percent solids content and the pH is adjusted to a value of 7.0. In a pump stability test, it is found that only a slight amount of coagulation is observed and very litte change in viscosity has occurred when the test is discontinued after 21 days. Comparative Latex C-3A when subjected to the same test exhibits severe coagulation after 9 days. For the pump test, 3000 milliliters of the latex at 10 percent solids is placed in a one-gallon container and pumped with a Model 9M143 Teel centrifugal immersion pump which operates at 3000 rpm. Water is added periodically to replace that lost by evaporation, i.e., to retain the same volume and concentration. The latex is observed periodically for evidence of destabilization. The test is discontinued after coagulation is severe enough to block the pump or at 21 days whichever occurs first.

EXAMPLE III

Two latexes are prepared according to the recipe of Table I containing copolymers of vinylbenzyl chloride having the same average composition but different placement of the polymerized vinylbenzyl chloride in the latex polymer particles.

Table I

| Component | Recipe Latex C-4 parts | Latex C-5 parts |
|---|---|---|
| Water | 300 | 200 |
| Dodecylbenzyldimethylsulfonium chloride (soap) | 1 | 1 |
| Azobisisobutyronitrile (initiator) | 2 | 2 |
| Styrene | 43 | 43 |
| Butadiene | 50 | 50 |
| 2-Hydroxyethyl acrylate | 2 | 2 |
| Dodecanethiol (Chain transfer agent) | 0.1 | 0.1 |
| Vinylbenzyl chloride | 5 | 5[a] |

[a]added at about 90 percent conversion of the styrene, butadiene and hydroxyethyl acrylate The latexes are prepared in a 2 gallon, glass-lined Pfaudler kettle fitted with a crowfoot agitator. The water, soap, chain transfer agent and initiator are loaded into the reactor at room temperature, the stirrer is started, the reactor is closed and the system is purged four times with nitrogen. The monomers (except for the vinylbenzyl chloride in Latex C-5) are forced into the reactor and the reactor contents are heated to 50° C and held at that temperature for 20 hours. The temperature then is raised to 70° C and the reaction is allowed to continue at that temperature until the reactor pressure attains a constant value. The resulting Latex C-4 is cooled and removed from the reactor. For Latex C-5, the vinylbenzyl chloride monomer is added to the reactor at this point and stirring at a temperature of 70° C is continued for 2 hours. The product (Latex C-5) is then cooled and removed from the reactor.

Analyses of the products show the following results:

Table II

| Latex | Solids % | Particle Size Angstroms | Conversion % |
|---|---|---|---|
| C-4 | 22.7 | 1320 | 90.8 |
| C-5 | 30.5 | 1340 | 95.5 |

To each latex is added 2 percent (based on polymer solids) of dodecylbenzyldimethylsulfonium chloride, then each latex is diluted with water to a solids content of 20 percent.

To one half of the diluted Latex C-5 is added 4 moles of a nucleophile, dimethyl sulfide, for each mole of polymerized vinylbenzyl chloride in the latex. The resulting reaction is allowed to continue at 30° C for the time shown in Table III below to produce Latex III-A. The other half of Latex C-5 is treated in the same manner except the same molar ratio of a different nucleophile, trimethylamine, is substituted for the dimethyl sulfide to produce Latex III-B. One half of Latex C-4 is treated as described for Latex III-A to produce comparative Latex C-4A. The other half of Latex C-4 is treated in the same manner as for Latex III-B to produce comparative Latex C-4B. The conversion of the benzyl chloride group to the benzyl onium ion is observed by titrating for chloride ion with silver nitrate solution.

The data are shown in Table III.

Table III

| Latex | Nucleophile[a] | Reaction Time Hours | Bound charge Meg/g of Polymer |
|---|---|---|---|
| III-A | DMS | 120 | 0.22 |
| III-B | TMA | 120 | 0.24 |
| C-4A | DMS | 912 | 0.07 |
| C-4B | TMA | 216 | 0.21 |

[a]DMS = dimethyl sulfide
TMA = trimethyl amine

These data show that the comparative Latex C-4 having relative uniform distribution of the copolymerized vinylbenzyl chloride converted more slowly and to a lesser extent than the structured particle latex, i.e. Latex C-5.

EXAMPLES IV-XI

A series of latexes are prepared in the same manner as for Latex C-5 with the following composition:

| Percentage | Monomer |
|---|---|
| 48-X | Styrene |
| 50 | Butadiene |
| 2 | 2-Hydroxyethyl acrylate |
| X | Vinylbenzyl chloride |

The resulting products, where X is 2.5 or 5.0, are formulated with sufficient additional dodecylbenzyldimethylsulfonium choride to provide a total of 2 percent by weight, based on the polymer in the latex. Each latex is diluted with water to a solids content of 20 percent. Portions of each diluted latex are then reacted with a nucleophile by the procedure described in Example III for the time shown in Table IV to obtain the products IV-XI. Conversion to the onium ion is observed by titration of the chloride ion liberated in the reaction and the products are vacuum stripped before evaluation. The stability of the latex products is evaluated with the rub test described above. The data are shown in Table IV.

Table IV

| Ex. No. | VBC$^a$ % | Nucleophile | Reaction time Hr. | Bound charge meq/g. | Stability No. of rubs |
|---|---|---|---|---|---|
| *C-6 | 2.5 | none | — | 0 | <1 |
| IV | 2.5 | Dimethylsulfide | 144 | 0.09 | 12 |
| V | 2.5 | Trimethylamine | 168 | 0.15 | >20 |
| VI | 2.5 | Pyridine | 170 | 0.05 | 8 |
| VII | 2.5 | Tetramethylthiourea | 198 | 0.09 | >20 |
| *C-7 | 5.0 | none | — | 0 | <1 |
| VIII | 5.0 | Dimethylsulfide | 314 | 0.26 | >20 |
| IX | 5.0 | Trimethylamine | 170 | 0.28 | >20 |
| X | 5.0 | Pyridine | 172 | 0.07 | 6 |
| XI | 5.0 | Tetramethylthiourea | 197 | 0.10 | >20 |

*not an example of the invention
$^a$VBC = vinylbenzyl chloride

The samples shown as <1 coagulate immediately when a drop of the latex is touched with a finger. The examples shown as >20 can be rubbed to dryness without coagulation.

The latexes are applied in side-by-side test patches on the same piece of standard redwood siding. The test board then is sequentially air-dried for 65 hours, is immersed in a bath of deionized water and is observed for the behavior of the coatings. For comparison with the cationic latexes of the invention, a very stable anionic latex containing a copolymer of styrene, butadiene, hydroxyethyl acrylate and itaconic acid is coated and tested in the same manner (comparative example C-8).

The anionic latex (C-8) begins to be absorbed by the wood immediately upon application (poor hold-out). The cationic latexes, IV-XI, remain on the surface and show no tendency to being absorbed (excellent hold-out). After drying, the anionic latex provides a coating having a dull appearance. The cationic latexes IV-XI provide clear, glossy coatings which adhere strongly to the surface of the redwood. The test results are summarized in Table V.

Table V

| | | | Appearance | | |
|---|---|---|---|---|---|
| | | Before | After Immersion | | |
| Latex | Hold-out | Immersion | Initial | 1 Hour | 24 Hours |
| IV | Excellent | Glossy | No effect | No effect | Sl. blush |
| V | Excellent | Glossy | No effect | No effect | Sl. blush |
| VI | Excellent | Glossy | No effect | Sl. blush | Blush |
| VII | Excellent | Glossy | No effect | No effect | No effect |
| IX | Excellent | Glossy | Severe blush | Swollen | Swollen |
| X | Excellent | Glossy | No effect | Sl. blush | Blush |
| XI | Excellent | Glossy | No effect | No effect | No effect |
| C-8 | Poor | Dull | Severe blush | Swollen | Swollen |

It can be seen that, except for Latex IX, all of the cationic latexes tested have superior water resistance after air drying in comparison with a stable anionic latex of the styrene/butadiene copolymer group.

EXAMPLES XII-XIX

A precursor latex is prepared in a batch emulsion polymerization reactor using 2 percent of azobisisobutyronitrile as initiator, 1 percent of dodecylbenzyldimethylsulfonium chloride as surfactant and 0.1 part of dodecanethiol and 0.1 part of 2,6-di-t-butyl-p-cresol as chain transfer agents for each 100 parts of monomers. The initiator, surfactant, chain transfer agents, and 233 parts of water are loaded into the reactor. Two parts of 2-hydroxyethylacrylate and 1.33 parts of styrene are added and the reactor is purged with nitrogen. Sufficient additional styrene to provide a total of 30 parts and 63 parts pf butadiene are added, the temperature is raised to 50° C and held for 4 hours, then is increased to 70° C. and held until the rate of pressure drop levels, i.e., about 7 hours. Five parts of vinylbenzyl chloride is then added and the temperature is maintained at 70° C for an additional 2 hours. The reactor contents are stirred throughout the reaction period. After the reactor is vented and the reacted mixture is cooled, the product is found to be a fluid latex (C-9) having a solids content of 27.7 percent, a particle size of 1250 Angstroms and a pH of 3.7. The latex is unstable to shear (less than 1 rub).

Various nucleophiles, as shown in Table VI, are mixed with separate portions of Latex C-9 and are allowed to react at the temperature and for the time as indicated in the table. The reaction time is selected according to the approximate amount of time required to obtain products which are very rub stable, i.e., stable for more than 20 rubs. For Example XII and Example XVII the reaction is carried out at a temperature varying from 25° to 50° C. After reaction, the resulting latexes are stripped under vacuum and filtered.

Table VI

| Example No. | Nucleophile | Amount meq/g Polymer | Reac. Temp. ° C | Reaction time hours | Cation$^a$ Concentration meq/g of Polymer |
|---|---|---|---|---|---|
| XII | Pyridine | 0.36 | 25/50 | 42.5 | 0.149 |
| XIII | Thiophane | 0.36 | 50 | 21 | 0.098 |
| XIV | Tetramethylthiourea | 0.38 | 25 | 28.5 | 0.349 |
| XV | Dimethylsulfide | 0.36 | 50 | 30 | 0.102 |
| XVI | Ethylthioethanol | 0.36 | 50 | 29.5 | 0.135 |
| XVII | Triphenylphosphine | 0.36 | 25/50 | 100 | 0.153 |

Table VI-continued

| Example No. | Nucleophile | Amount meq/g Polymer | Reac. Temp. °C | Reaction time hours | Cation[a] Concentration meq/g of Polymer |
|---|---|---|---|---|---|
| XVIII | Triethylamine | 0.36 | 50 | 18 | 0.152 |
| XIX | Trimethylamine | 0.36 | 50 | 3 | 0.174 |

[a]Includes 0.03 meq. of conventional surfactant per gram of polymer.

The pH of the filtered products is adjusted to a desired range to give formulations which are used to coat aluminum test panels (Parker 3003-H14, 4 in. × 6 in. × 0.025 in.). These formulations are shown in Table VII.

Table VII

| Example No. | Solids % | pH |
|---|---|---|
| XII | 41.3 | 8.9 |
| XIII | 41.4 | 8.5 |
| XIV | 31.5 | 7.4 |
| XV | 43.2 | 9.0 |
| XVI | 38.1 | 9.0 |
| XVII | 38.9 | 8.4 |
| XVIII | 40.1 | 11.9 |
| XIX | 39.6 | 11.9 |

Duplicate coated panels for each example are baked in an oven at 175° C, one panel for 5 minutes and the other panel for 30 minutes. The baked panels are then immersed in water at 70° C for 2 hours and the appearance is recorded before and after the water treatment. The data are shown in Table VIII.

Table VIII

| Example No. | Water[a] Soak | Curing Conditions[b] 5-Minute Bake Appearance | 30-Minute Bake Appearance |
|---|---|---|---|
| XII | Before | Dk. Yellow | Dk. Yellow |
|  | After | Blushed | Unaffected |
| XIII | Before | Clear | Clear |
|  | After | Clear | Clear |
| XIV | Before | Sl. Yellow | Dk. Yellow |
|  | After | Clear | Dk. Yellow |
| XV | Before | Clear | Clear |
|  | After | Clear | Clear |
| XVI | Before | Clear | Clear |
|  | After | Clear | Clear |
| XVII | Before | Yellow | Sl. Yellow |
|  | After | Blushed | Unchanged |
| XVXII | Before | Yellow | Dk. Yellow |
|  | After | Blushed | Unchanged |
| XIX | Before | Yellow | Dk. Yellow |
|  | After | Blushed | Unchanged |

[a] = Panel immersed in 70° C water bath for 2 hours.
[b] = Air oven at 175° C

Additionally, it is found that the adhesion of the coatings is good for all of the baked panels Examples XII--XIX before the hot water treatment, as determined by applying a piece of pressure sensitive tape (Scotch tape), then rapidly pulling the tape. Following the water treatment, adhesion is tested in the same manner after excess water is blown form the panels and they are dried in air at ambient temperature for 30 minutes. In this test, none of the coating is removed from any of the panels.

EXAMPLES XX-XXII

A latex is prepared in a batch recipe by an emulsion polymerization reaction of 40 parts of styrene and 55 parts of butyl acrylate in 300 parts of water using 0.2 part of dodecanethiol, 2 parts of azobisisobutyronitrile and 5 parts of dodecylbenzyldimethylsulfonium chloride with stirring for 17 hours at 50° C and 1 hour at 70° C to provide a monomer conversion of about 90 percent, then 5 parts of 2-bromoethyl methacrylate is added and the same reaction conditions are maintained for an additional 2 hours. After the reactor is vented and cooled, the product is found to be a fluid latex (C-10) having a solids content of 25.7 percent and a particle size of 1070 Angstroms. The latex has poor shear stability (less than 1 rub).

The nucleophiles as shown in Table IX are mixed with separate portions of Latex C-10 and the resultant mixtures are allowed to stand at 25° C until the reactions have proceeded at least until the latex products are rub stable.

Table IX

| Ex. No. | Nucleophile Kind | Amount[a] | Reaction Time days | Charge[b] Total | Bound |
|---|---|---|---|---|---|
| XX | Dimethyl sulfide | 0.52 | 17 | 0.16 | 0.06 |
| XXI | Trimethylamine | 0.52 | 10 | 0.22 | 0.10 |
| XXII | Tetramethylthiourea | 0.29 | 4 | 0.27 | 0.15 |

[a]meq/g based on polymer in starting latex
[b]meq/g based on polymer in product latex

EXAMPLE XXIII

A 126-gram portion of Latex XX containing 31.1 percent solids and having a total of 0.16 milliequivalent of sulfonium group per gram of polymer, of which 0.06 milliequivalent is chemically bound at or near the surface of the particles, is mixed with a 7:1 excess of hydrogen peroxide (4.97 grams of a 30 percent solution) and the resulting mixture is stirred in a closed reactor at 35° C. for 22 hours. A substantial proportion of the sulfonium groups are oxidized to sulfoxonium groups. There is no loss of colloidal stability and the product has considerably less odor than Latex XX.

EXAMPLES XXIV-XXVI

A latex is prepared by an emulsion polymerization reaction of 40 parts of styrene, 55 parts of butyl acrylate in 300 parts of water using 0.2 part of dodecanethiol, 2 parts of azobisisobutyronitrile, and 4 parts of dodecylbenzyldimethylsulfonium chloride with stirring for 18 hours at 50° C and 2 hours at 70° C to provide a monomer conversion of about 90 percent, then 5 parts of 2-chloromethylbutadiene is added and the same reaction conditions are maintained for an additional 2 hours. After the reactor is vented and cooled, the product is found to be a fluid latex (C-11) having a solids content of 24.3 percent and a particle size of 1450 Angstroms. The latex has poor shear stability, i.e. less than 1 rub.

The nucleophiles as shown in Table X are mixed with separate portions of Latex C-11 and the resultant mixtures are allowed to stand at 35° C at least until reactions have proceeded sufficiently that the products are very rub stable (greater than 20 rubs).

Table X

| Ex. No. | Nucleophile Kind | Amount[a] | Reaction time Days | Charge[b] Total | Bound |
|---|---|---|---|---|---|
| XXIV | Thiophane | 0.80 | 4 | 0.402 | 0.265 |
| XXV | Trimethyl-amine | 0.50 | 4 | 0.342 | 0.205 |
| XXVI | Tetramethyl- | 0.50 | 4 | 0.535 | 0.398 |

Table X-continued

| Ex. No. | Nucleophile Kind | Amount[a] | Reaction time Days | Charge[b] Total | Bound |
|---|---|---|---|---|---|
| | thiourea | | | | |

[a]meq/g based on polymer in starting latex
[b]meq/g based on polymer in product latex

EXAMPLE XXVII

A latex is prepared by an emulsion polymerization reaction of 50 parts of methyl methacrylate and 45 parts of butylacrylate in 300 parts of water using 0.2 part of dodecanethiol, 2 parts of azobisisobutyronitrile and 4 parts of dodecylbenzyldimethylsulfonium chloride with stirring for 16 hours at 50° C and 3 hours at 70° C to provide a monomer conversion of about 90 percent, then 5 parts of vinyl bromide is added and the same reaction conditions are maintained for an additional 2 hours. After the reactor is vented and cooled, the product is found to be a fluid latex (C-12) having a solids content of 23.8 percent and a particle size of 1490 Angstroms. The latex has poor shear stability (less than 1 rub).

With a portion of Latex C-12 is mixed 0.52 milliequivalent of tetramethylthiourea for each gram of polymer in the latex portion and the resulting mixture is allowed to stand at 25° C for 7 days. The latex product is shear stable (greater than 20 rubs) and has a total charge of 0.28 milliequivalent and a bound charge of 0.20 milliequivalent for each gram of polymer in the latex.

EXAMPLES XXVIII-XXIX

A latex is prepared by batch emulsion polymerization of 54 parts of styrene, 44 parts of butadiene and 2 parts of 2-hydroxyethyl acrylate using 0.1 part of dodecanethiol as chain transfer agent, 2,2'-azobisisobutyronitrile as catalyst, 1 part (active basis) of dodecylbenzyldimethylsulfonium chloride as emulsifier and a polymerization time of 3 hours at 50° C and 7 hours at 70° C. After being cooled and filtered through cheesecloth, the resulting initial latex (C-13) having a solids content of 37.9 percent, is allowed to stand for 18 months. As determined by examination with a microscope, the latex particles are relatively uniform in size and have an average particle diameter of 1265 Angstroms. Sufficient deionized water is mixed with 1980 parts (wet basis) of the initial latex to provide 4000 parts by weight of diluted latex. Diluted Latex C-13 and 10 parts of 2,2'-azobisisobutyronitrile are placed in a reactor which is then purged with nitrogen. After the reactor contents are heated to 50° C, a monomer mixture containing 200 parts of styrene and 50 parts of vinylbenzyl chloride is forced into the reactor by pressure. The temperature of the reactor contents is raised to 70° and maintained for 4 hours while the contents are stirred. After the resulting product is cooled and filtered, it is found that a latex (C-14) containing 21.0 percent solids is obtained. As determined by examination with a microscope, the latex particles are relatively uniform in size and have an average diameter of 1444 Angstroms. No evidence is found by comparison of the micrograph of Latex C-13 with the micrograph Latex C-14 that any new particles are initiated. Latex C-14 contains 0.042 milliequivalent of chloride ion per gram of solids (from the emulsifier).

With a portion of Latex C-14 there is mixed 2 moles of trimethylamine for each mole of polymerized vinylbenzyl chloride in the latex and the mixture is stirred for 20 hours at ambient temperature. The resulting latex (XXVIII) is rub stable and contains 0.085 milliequivalent of chloride ion for each gram of solids—indicating a reaction of 0.043 milliequivalent of trimethylamine per gram of solids (0.085-0.042). The excess trimethylamine is removed by vacuum distillation (Rinco Evaporator).

Another portion of Latex C-14 is treated in the same manner as described for Latex XXVIII except that the reaction time is 4 days rather than 20 hours. The latex (XXIX) is rub stable and is found to contain 0.24 milliequivalent of chloride ion per gram of solids—indicating a reaction of 0.2 milliequivalent of trimethylamine per gram of solids (0.24-0.042).

EXAMPLE XXX

A latex is prepared substantially as described in Example II except (a) the second monomer solution is not added; (b) the first monomer solution consists of 26 percent of styrene, 24 percent of vinylbenzyl chloride, and 40 percent of butadiene as monomers and 0.1 part of dodecanethiol per 100 parts of monomer; and (c) the continuous initiator stream, the continuous reducing agent stream, stirring and the reaction temperature of 50° C are continued for 4 hours after discontinuance of the feeding of the first monomer solution. The product is a fluid latex having 39.8 percent of polymer solids. The latex is filtered and dialyzed against deionized water for 72 hours. The emulsifier level is adjusted to 0.1 milliequivalent of dodecylbenzyldimethylsulfonium chloride per gram of solids. The latex is diluted to 20 percent solids (Latex C-15). To Latex C-15 is added 0.25 milliequivalent of dimethyl sulfide per gram of polymer solids and the resulting mixture is stirred at 30° C. Samples are taken periodically and the unreacted vinylbenzyl chloride is stripped from the samples to stop the reaction. The samples are titrated for chloride ion to determine the sulfonium concentration. The results are shown in Table XI.

TABLE XI

| Reaction Time Days | Sulfonium Ion Meq/g of Polymer | | Particle Size Angstroms | Comments[a] |
|---|---|---|---|---|
| | Total | Bound | | |
| 0 | 0.10 | 0.00 | — | not rub stable |
| 1 | 0.20 | 0.10 | 1190 | very stable[a], low viscosity |
| 2 | 0.29 | 0.19 | 1190 | very stable, low viscosity |
| 4 | 0.42 | 0.32 | 1190 | very stable, low viscosity |
| 8 | 0.74 | 0.64 | 1390 | very stable, thickened |
| 16 | 1.12 | 1.02 | 1450 | very stable, thickened |

[a]Stability according to the stability test described above with Rotovisco viscometer.

These results show that the particles swell substantially with 0.64 meq. of bound charge per gram of polymer or higher. The latexes with high charge can not be concentrated above 35 percent solids without becoming very thick and, in many cases, without gelling. The latexes with from 0.1 to 0.32 meq. of bound charge per gram are very stable and low in viscosity. They contain substantial amounts (from 1.25 to 1.47 meq/g.) of unconverted benzyl chloride groups. When cast and dried, the latexes form hydrophobic films which can be crosslinked by oxidative curing through the butadiene double bonds. The chloromethyl groups in the resulting crosslinked films are then available for quaternization to yield an ionic membrane.

That which is claimed is:

1. A method for preparing a cationic structured-particle latex comprising the steps of reacting at a temperature from about 0° to about 80° C a water-stable, non-ionic nucleophile which is capable of diffusing through aqueous media with a latex of copolymer particles having activated halogens bound to a thin layer of the copolymer at or near the particle surface; said nucleophile having a hetero atom as a center of nucleophilicity wherein each covalent bond of said hetero atom is to a carbon atom; said activated-halogens being present in an amount from about 0.01 to about 3.0 milliequivalents per gram of copolymer in the latex, with the proviso that the amount of activated-halogen bound to the thin layer at or near the particle surface is in the range of from about 0.4 to about 3.0 milliequivalents for each gram of polymer in the thin layer, whereby pH independent cationic groups are chemically bound to the particles at or near the particle surface.

2. The method of claim 1 in which the reaction is carried out until the pH independent cationic groups are present in an amount from about 0.01 milliequivalent to about 0.5 milliequivalent per gram of copolymer.

3. The method of claim 1 which is carried out until the pH independent cationic groups are present in the thin layer in an amount of from about 0.4 milliequivalent to about 1.6 milliequivalent per gram of polymer in the layer.

4. The method of claim 1 in which the latex of copolymer particles having activated-halogens is a structured-particle latex of copolymer particles consisting of a nonionic, organic polymer core having adhered thereto a thin layer of a water-insoluble copolymer of (a) an ethylenically unsaturated, nonionic monomer which is devoid of an activated-halogen and (b) a nonionic, ethylenically unsaturated, activated-halogen monomer; the amount of the activated-halogen in the copolymer being from about 0.01 milliequivalent to about 1.4 milliequivalents per gram of copolymer.

5. The method of claim 1 in which the latex of copolymer particles having activated-halogens bound to a thin layer of the copolymer at or near the particle surface also has bound activated-halogens throughout the particles.

6. The method of claim 1 in which the activated-halogens are provided by a copolymerized monomer selected from the group consisting of vinylbenzyl chloride, 2-chloromethylbutadiene, vinyl bromide, a bromoalkyl acrylate, and a bromoalkyl methacrylate.

7. The method of claim 1 in which the nucleophile is a tetraalkylthiourea.

8. The method of claim 1 in which the nucleophile is a compound having the formula $R_1$—S—$R_2$ wherein $R_1$ and $R_2$ individually are lower alkyl, hydroxy lower alkyl or wherein $R_1$ and $R_2$ are combined as one alkylene radical having 3 to 5 carbon atoms, whereby the chemically bound cationic groups are sulfonium groups.

9. The method of claim 8 which has the additional step of oxidizing at least a part of the sulfonium groups to sulfoxonium groups.

10. An aqueous colloidal dispersion of cationic structured-particles of polymer consisting of a nonionic, organic polymer core encapsulated by a thin layer of a water-insoluble organic copolymer having pH independent cationic groups chemically bound to the organic copolymer at or near the particle surface; said cationic groups being present in an amount from about 0.01 milliequivalent to about 0.5 milliequivalent per gram of structured particles; said amount also being in the range of from about 0.4 milliequivalent to about 2.5 milliequivalents per gram of copolymer in the thin layer.

11. The aqueous colloidal dispersion of claim 10 in which the amount of cationic groups is from about 0.04 milliequivalent to about 0.35 milliequivalent per gram of structured particles.

12. The aqueous colloidal dispersion of claim 10 in which the amount of cationic groups is less than about 1.6 milliequivalents per gram of copolymer in the thin layer.

13. The aqueous colloidal dispersion of claim 10 in which the cationic groups predominantly are sulfonium groups.

14. The aqueous colloidal dispersion of claim 10 in which the cationic groups predominantly are isothiouronium groups.

15. The aqueous colloidal dispersion of claim 10 in which the cationic groups predominantly are quaternary ammonium groups.

16. The aqueous colloidal dispersion of claim 15 in which quaternary ammonium groups are pyridinium groups.

17. The aqueous colloidal dispersion of claim 10 in which colloidal stability is provided predominantly by the cationic groups chemically bound to the copolymer at or near the particle surface.

18. The aqueous colloidal dispersion of claim 10 in which at least part of the cationic groups are sulfoxonium groups.

19. The method of claim 1 in which the nucleophile is selected from the group consisting of
  a. monobasic aromatic nitrogen compounds
  b. tetra (lower alkyl) thioureas
  c. $R_1$—S—$R_2$ wherein $R_1$ and $R_2$ individually are lower alkyl, hydroxy lower alkyl or wherein $R_1$ and $R_2$ are combined as one alkylene radical having 3 to 5 carbon atoms
  d.

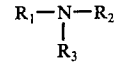

wherein $R_2$ and $R_3$ individually are lower alkyl or hydroxy lower alkyl, or are combined as one alkylene radical having 3 to 5 carbon atoms and $R_1$ is lower alkyl, aralkyl or aryl except when $R_2$ and $R_3$ together are an alkylene radical then $R_1$ is lower alkyl or hydroxy lower alkyl, and
  e.

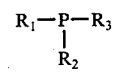

wherein $R_1$, $R_2$ and $R_3$ individually are lower alkyl, hydroxy lower alkyl or aryl.

* * * * *